United States Patent Office 3,031,372
Patented Apr. 24, 1962

3,031,372
FUNGICIDES HAVING THE 1,2-DITHIOLE NUCLEUS
Karl Brack, Wilmington, Del., assignor to Hercules Powder Company, Wilmington, Del., a corporation of Delaware
No Drawing. Filed Feb. 24, 1959, Ser. No. 794,839
9 Claims. (Cl. 167—33)

This invention relates to halogenated 1,2-dithioles and to fungicidal compositions containing the same.

In accordance with the present invention, it has been found that the fungicidally active compounds of the general formula

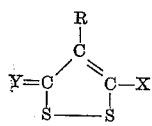

in which R is a hydrocarbon radical having no ethylenic or acetylenic unsaturation, X is a halogen, and Y is oxygen or two halogens are produced by contacting a 1,2-dithiole of the formula

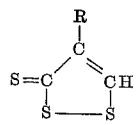

with a halogen and by hydrolysis of the trihalide.

The product obtained when the treatment with halogen is carried out in the absence of water is a trihalide of the above general formula in which Y represents two halogen atoms and X represents the same halogen. The halogens in compounds in which Y represents halogen are hydrolyzed by contact with water to form a compound in which Y represents oxygen. Since one mole of water is required for complete hydrolysis, less than one mole will produce a mixture containing some unhydrolyzed trihalide which on contacting with an excess of water will be hydrolyzed completely to the compound in which Y is oxygen. In the hydrolysis process, X is not hydrolyzed by contacting with water and is stable.

The compounds of the general formula above are all effective in preventing the growth of fungi. Since the compounds in which Y represents halogen atoms hydrolyze under humid conditions, liberating hydrogen chloride, those compounds in which Y represents oxygen are preferred for use under conditions where hydrogen halide liberated would be harmful. The compounds in which Y represents halogen have an economic advantage over those in which Y represents oxygen and are preferred from this standpoint for some uses.

The following examples are illustrative of the method of preparing the compounds of this invention and of the manner of using them. In view of the simplicity of the reactions involved, many variations are possible, and the examples are not to be construed as limiting as to the method of preparation or use. All parts and percentages are by weight.

*Example 1*

4-phenyl-1,2-dithiole-3-thione was prepared by heating cumene with sulfur (J. Am. Chem. Soc. 77, 4255 (1955)). A solution of 504 parts purified 4-phenyl-1,2-dithiole-3-thione in 4850 parts chloroform was heated to 50° C. and chlorine gas was introduced under reflux at about 60° C. at the rate of about 115 parts per hour until 562 parts chlorine had been added. This required about 4½ hours. Crystals separated during this chlorination. The solution was then cooled to 20–25° C., and the crystals were filtered and washed with hexane. This crystalline material amounting to about 410 parts was 3,3,5'-trichloro-4-phenyl-1,2-dithiole which analyzed S, 22.5%; Cl, 33.6%. It was suspended in 1750 parts benzene, the suspension was cooled to 15° C. and 2000 parts water was added over a twenty-minute period with cooling to hold the temperature at 30° C. while stirring vigorously. The vigorous stirring was continued over night for convenience although the hydrolysis was complete in only a few hours. The benzene layer was separated and washed with water, and then dried over sodium sulfate. The benzene was then evaporated under reduced pressure to obtain a crystalline residue which after recrystallization from ethanol amounted to 276 parts. On recrystallization there was obtained pure 5-chloro-4-phenyl-1,2-dithiole-3-one, M.P. 96–98° C., which analyzed S, 28.1%; Cl, 15.4%.

*Example 2*

4-p-tolyl-1,2-dithiole-3-thione was prepared by heating p-cymene with sulfur by the procedure of the reference cited in Example 1. A solution of 538 parts purified 4-p-tolyl-1,2-dithiole-3-thione in 4850 parts chloroform was heated to 50° C. and contacted with 562 parts chlorine which was added gradually over a 5-hour period while keeping the temperature in the 50–60° C. range. When the reaction was complete, no crystals separated on cooling. An equal volume of hexane was added to precipitate the product as yellow crystals. The crystalline product amounting to about 400 parts was 3,3,5-trichloro-4-p-tolyl-1,2-dithiole. It analyzed 22.0% S and 33.1% Cl, and was not purified further, but was suspended in 1750 parts benzene and was hydrolyzed by gradual addition of 2000 parts water at 15–25° C. while vigorously stirring as in Example 1. The benzene layer was separated, washed with water, and freed of benzene by evaporation under reduced pressure to obtain a residue amounting to 252 parts which crystallized from ethanol as red crystals of M.P. 65–71° C. analyzing 14.8% Cl and 26.5% S. On further purification, a melting point of 74–74.5° C. was obtained for the pure 5'-chloro-4-p-tolyl-1,2-dithiole-3-one.

*Example 3*

To a stirred mixture of 42 parts 4-phenyl-1,2-dithiole-3-thione in 400 parts chloroform heated at 50–60° C. was added dropwise with stirring 105.6 parts liquid bromine over a 1-hour period. The resulting crystalline slurry was cooled and filtered to separate the 3,3,5-tribromo-4-phenyl-1,2-dithiole as a red-brown crystalline solid which was separated by filtration. It was washed with hexane and, after taking a sample which analyzed 57.2% bromine, was hydrolyzed directly. The hydrolysis was accomplished as in the previous examples by contacting a benzene suspension with water while cooling to remove the heat of reaction. The product crystallized in part from the benzene, and the remaining part was recovered by distilling off the benzene under reduced pressure and crystallizing from ethanol. This crystalline product melted at 210° C. with decomposition and was 5-bromo-4-phenyl-1,2-dithiole-3-one analyzing 29.0% bromine.

*Example 4*

5-bromo-4-p-tolyl-1,2-dithiole-3-one was prepared in the same manner as the corresponding phenyl derivative was prepared in Example 3. It was separated as a crystalline solid and was shown to be a fungicide without further purification.

*Example 5* p-Isopropyldiphenyl was reacted with sulfur by the method of Fields (l.c.) to produce 4-(4-biphenylyl)-1,2-dithiole-3-thione and this compound was chlorinated as in Example 1 to produce 3,3,5-trichloro-4-(4-biphenylyl)-1,2-dithiole which was then hydrolyzed as in Example 1 by stirring a benzene suspension with water to obtain 5-chloro-4-(4-biphenylyl)-1,2-dithiole-3-one which was a light brown powder analyzing 12.1% chlorine and 20.7% sulfur.

*Example 6*

To a stirred, refluxing mixture of 112 parts 4-p-tolyl-1,2-dithiole-3-thione in 2640 parts of benzene at about 80° C. was added dropwise a mixture of 250 parts sulfur dichloride and 440 parts benzene over a 1-hour period. The reaction mixture was cooled and filtered. The product obtained was washed with benzene and dried in vacuo. The yield was 122 parts of 3,3,5-trichloro-4-p-tolyl-1,2-dithiole. It analyzed 22.6% S and 33.2% Cl. Three parts of the product were hydrolyzed by stirring with a mixture of 79 parts of glacial acetic acid and 8 parts of distilled water at 15–25° C. The acetic acid was removed under reduced pressure, and 100 parts of benzene were added. The benzene layer was separated and washed with 20 parts of distilled water. The benzene was removed by reduced pressure evaporation, and 2.1 parts of 5-chloro-4-p-tolyl-1,2-dithiole-3-one were obtained. It analyzed 27.0% S and 13.5% Cl and corresponded to the product of Example 2, M.P. 74–74.5° before purification.

*Example 7*

4-methyl-1,2-dithiole-3-thione was prepared from isobutylene and sulfur according to R. S. Spindt et al., J. Am. Chem. Soc., 73, 3695 (1951). This product was chlorinated and hydrolyzed as described in Example 1 to yield 3,3,5-trichloro-4-methyl-1,2-dithiole and 5-chloro-4-methyl-1,2-dithiole-3-one, respectively. These compounds when tested at 0.2% concentration in aqueous emulsion prevented germination of at least 50% of *Alternaria oleracea* and *Monilinia fructicola* spores at 1 p.p.m. concentrations.

The compounds of the present invention all have the 1,2-dithiole ring system in which there is a double bond in the ring. Compounds in which the R group has no hydrogen on the alpha carbon are preferred since the double bond in such compounds has a fixed location in the heterocyclic ring. Thus while R may be any hydrocarbon radical having no ethylenic or acetylenic unsaturation, it is preferably a radical attached to the dithiacyclopentene ring through a tertiary carbon such as in the t-butyl radical, the phenyl radical, and the methyl cyclopentyl radical. The fungicidal activity appears to lie in the 3-halo-1,2-dithiole ring system depicted as follows:

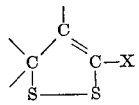

and the R group of the general formula has about the same influence on activity based on its relative weight as would a corresponding amount of inert material. For practical purposes, the R group may be limited to about 18 carbon atoms. Representative values of R are: phenyl and substituted phenyl such as o-, m- and p-tolyl, biphenylyl, o-, m- and p-isopropyl phenyl, naphthyl, phenanthryl, and their alkyl derivatives, methyl, ethyl, isopropyl, t-butyl, t-amyl, stearyl, 1-methyl cyclohexyl, and 1-methyl cyclopentyl.

The process for the halogenation of the 1,2-dithiole-3-thione by elementary halogen requires at least two moles of halogen. One mole of halogen is required in replacing the sulfur of the thione group and the second mole of halogen is required to effect substitution of the hydrogen on the 1,2-dithiole ring by halogen. Due to a side reaction, sulfur monohalide is formed by reaction of sulfur and halogen, and sulfur monohalide may remain in the reaction mixture after halogenation is complete.

The halogenation may be carried out on the 1,2-dithiole-3-thione with or without a solvent. It is preferable to use a solvent such as a halogenated hydrocarbon, or a hydrocarbon which is not readily halogenated. Halogenation solvents such as these are known in the art. The preferred solvents are methylene chloride, chloroform, carbon tetrachloride and ethylene dichloride.

Halogenation is also brought about using other halogenation agents such as sulfur dichloride. However, since sulfur dichloride depends on an equilibrium shift in the reaction:

$$SCl_2 \rightleftharpoons S + Cl_2$$

this reagent effects chlorination more slowly. It is accelerated by use of a solvent in which the sulfur is insoluble. The chlorine reacts to produce the same products as are produced in chlorination with elementary chlorine.

The halogenation temperature is in the range of 40° C.–125° C. when either elementary chlorine or sulfur dichloride is used. While the thione group reacts readily, the substitution of the hydrogen on the ring by halogen requires a slightly higher temperature. Thus, while the thione may be halogenated below the above-designated range, a temperature of 40° C. appears to be critical, particularly if the compound being halogenated has an alkyl group rather than an aryl group in the R position. If no solvent is used, the temperature should be high enough to melt the starting material. When a solvent is used, the exothermic reaction is controlled by the refluxing of the solvent. In the case of carrying out the reaction at atmospheric pressure, the reaction temperature is approximately the boiling point of the solvent used. The temperature will vary somewhat with the compound being halogenated and should not be so high that the —S—S— linkage of the ring is broken. The preferred halogenation temperature is in the range of about 40° C. to 125° C. for either chlorine or bromine.

Both the trihalodithiole compounds and the monohalodithiole-3-one compounds of all of the examples were tested against fungi in the standard spore germination test (Phytopathology 37, 354–356 (1947)) and found to be effective in preventing germination of at least 50% of *Alternaria oleracea* and *Monilinia fructicola* spores at a concentration of 10–100 p.p.m. in an aqueous suspension.

The trihalo- and the monohalo-compounds of Examples 1 and 2 were also tested at 0.2% concentration in aqueous suspension (produced by adding an acetone solution of the toxicant and Tween 20 to water) for control of early blight (*Alternaria solani*) and late blight (*Phytophthora infestans*) of tomatoes. (Contrib. Boyce Thompson Institute 13, 93–134 (1943) describes method used.) The sprayed tomato plants were completely protected against both diseases by these materials.

Pea seeds and cucumber seeds dusted with a 50% wettable powder of the monohalo-compound of Example 1 in an amount of 8 parts per 1000 parts of seed gave 3 to 4 times the percentage emergence of seedlings as the untreated seeds. Using the monohalo-compound of Example 2, these seeds resulted in about 4 times the percentage emergence of seedlings as untreated seeds.

Soil infected with Rhizoctonia species of fungi which cause damping off of seedlings was mixed with 0.044 gram of the trihalo-compound of Example 1 per pint of soil. Cotton seeds planted in this soil showed 90% emergence of healthy plants, while cotton seeds planted in the same infected but untreated soil showed 66% emergence of cotton plant seedlings, but only 4% were healthy plants.

A similar improvement in emergence was noted by treatment of soil infected with Pythium species of fungi which cause preemergence damping off of seedlings using the same concentration of the monohalo-compound of Example 1.

The monohalodithiole-3-one compounds of this invention are particularly advantageous as replacements for mercurials because of their lower toxicity to warm-blooded animals. This is of great value in the treatment of seeds which might accidentally be eaten by farm animals.

The compounds of this invention are used as fungicides by distribution in low concentrations on the material which is to be protected. Materials which support the growth of fungi are thus dusted, or sprayed, or dipped in a dilute composition of the compounds of this invention and a diluent which performs the function of a carrier for the toxicant. Materials which may be so treated include wood, paper, leather, cloth, seeds, seedlings and mature plants, soil and solutions containing nutrients for fungi such as water containing materials which support fungi growth. Dusts may comprise any of the well known inert finely divided solid materials known in the art as carriers for insecticides such as finely divided clays of all types, ground chalk or marble. The dusts may include a small amount of a wetting agent to make a wettable powder. The hydrolyzed products may be used with suitable wetting agents on solid carriers to form dusts or wettable powders. The fungicides may also be used in solution. Since the unhydrolyzed compounds hydrolyze in contact with water, they are converted into the hydrolyzed compounds when made up into aqueous suspensions. The unhydrolyzed compounds may be hydrolyzed, if desired, by dispersing in water containing an alkali or alkaline earth hydroxide, carbonate or bicarbonate in an amount sufficient to neutralize the hydrogen halide set free, and a surface acting dispersing agent in minor amount to aid in dispersion. The hydrolyzed compound may be made into a similar emulsion without the need for the alkaline material to neutralize hydrogen halide. The toxic materials may also be used in admixture with other dispersible volatile liquids in suspension or solution in kerosene, alcohol, acetone, benzene, chlorinated solvents and other organic solvents in which the products can be dispersed or dissolved in effective amounts. The concentration of toxic material of this invention in a composition with a carrier is usually in the range of 5 to 75%.

What I claim and desire to protect by Letters Patent is:

1. A composition of matter of the formula

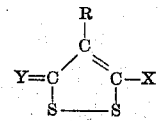

in which R is a hydrocarbon radical selected from the group consisting of phenyl, o-, m-, and p-tolyl, biphenylyl, o-, m-, and p-isopropyl phenyl, naphthyl, phenanthryl, 1-methyl cyclohexyl 1-methyl cyclopentyl, and alkyl radicals of 1–18 carbon atoms, X is a halogen, and Y is selected from the group consisting of oxygen and halogens.

2. 5-chloro-4-phenyl-1,2-dithiole-3-one.
3. 5-chloro-4-p-tolyl-1,2-dithiole-3-one.
4. 5-chloro-4-methyl-1,2-dithiole-3-one.
5. 3,3,5-trichloro-4-phenyl-1,2-dithiole.
6. 3,3,5-trichloro-4-p-tolyl-1,2-dithiole.
7. 3,3,5-trichloro-4-methyl-1,2-dithiole.
8. As a fungicidal composition of matter a compound of claim 1 in admixture with a major amount of an inert finely divided dispersible solid.
9. As a fungicidal composition of matter a compound of claim 1 in admixture with a major amount of an inert dispersible volatile liquid.

No references cited.